United States Patent [19]

Krystyniak et al.

[11] 4,197,104
[45] Apr. 8, 1980

[54] MAGNETIC TAG PROCESS

[75] Inventors: Casimir W. Krystyniak; Marcus P. Borom, both of Schenectady, N.Y.

[73] Assignee: General Electric Company, Schenectady, N.Y.

[21] Appl. No.: 944,386

[22] Filed: Sep. 21, 1978

[51] Int. Cl.$^2$ ............................................. C03B 19/10
[52] U.S. Cl. ........................................ 65/21; 149/2;
149/21; 250/302; 242/301.1 R; 252/408; 427/157
[58] Field of Search ................ 427/157; 149/2 T, 21;
252/301.1 R, 408; 250/302; 65/18, 21

[56] References Cited
U.S. PATENT DOCUMENTS

| | | | |
|---|---|---|---|
| 3,441,396 | 4/1969 | D'Eustachio et al. | 65/18 X |
| 3,656,921 | 4/1972 | Wilcox | 65/21 |
| 3,736,500 | 5/1973 | Berkowitz et al. | 324/34 R |
| 3,772,099 | 11/1973 | Ryan et al. | 427/157 X |
| 3,772,200 | 11/1973 | Livesay | 149/2 T X |
| 3,967,990 | 7/1976 | Ryan et al. | 149/2 T X |
| 4,131,064 | 12/1978 | Ryan et al. | 149/2 T X |

OTHER PUBLICATIONS

Magnetic Tagging of Explosives Utilizing Curie Point Indentification, G. N. Roberts, U.S. Dept. of the Treasury, 8-1978, Contract #F04701-77-C-0078.

Primary Examiner—Robert L. Lindsay, Jr.
Attorney, Agent, or Firm—Lawrence D. Cutter; James C. Davis; Marvin Snyder

[57] ABSTRACT

Ferrite particles having a plurality of distinct Curie temperatures are encapsulated within a glass matrix to provide tagging material especially useful in identifying explosive materials even after detonation. In one embodiment, phosphor is dispersed within the glass matrix or an intrinsically fluorescent glass is employed to facilitate visual identification and collection of tag particles following detonation. The tags are also usable in tagging other articles, especially where harsh environmental conditions are likely to be encountered.

12 Claims, 4 Drawing Figures

MAGNETIC TAG PROCESS

BACKGROUND OF THE INVENTION

This invention relates to magnetic tags, and more specifically to magnetic tags comprising glass encapsulated ferrite particles which are particularly useful in identifying explosives, even after detonation.

A companion application relating to the tags themselves rather than processes for producing them has previously been filed as Ser. No. 929,500; 7/28/78, by Berkowitz et al.

Police and other investigative authorities have long been hampered in their investigations of bombing incidents by the inability to quickly and accurately determine the source of the explosive compound employed. A method to identify the explosive employed as to manufacturer, type of explosive, date of manufacture, and even the manufacturing production shift would be very useful in tracing the explosive compound to its ultimate criminal user. It is also useful to identify explosive compounds used in certain mining operations to determine whether a permissible explosive compound was employed.

Such a tag for an explosive must satisfy certain requirements. First, the tag must not sensitize the explosive material, that is, the tag must not render the explosive material susceptible to premature or accidental detonation. Second, the tag must not be adversely affected by contact with the components of the explosive. Third, the tag must be able to survive exposure to the elements over prolonged periods of time without significant degradation. Fourth, the tag must be resistant to the heat and pressure of the explosion. Fifth, the tag must be readily recoverable after detonation. Sixth, the procedure to identify the tag should be readily performable.

Prior art solutions to this problem have consisted of two basic approaches. The first approach employs plastic flakes approximately 0.04 millimeters thick, with each flake comprising seven colored layers with colors that are repeatable except in adjacent layers. With ten colors thus employed in seven layers, there are approximately 3 million possible color combinations (tag codes). However, these flakes have a low probability of survival when employed in high energy explosives such as gelatin dynamite, boosters, and certain two-component explosives. The second approach employs ferrites having distinct Curie temperatures coated with potassium silicate or sodium silicate. However, in this latter approach, the bonding of the coating to the ferrite is weak, the coating has a tendency to deteriorate in air and the exterior of the silicate coated particles is not sufficiently smooth for use in tagging explosives. Both of these prior art tagging approaches utilize a phosphor to facilitate post-detonation detection and retrieval of the tag particles. Nevertheless, both of these approaches exhibit undesirable survival characteristics.

SUMMARY OF THE INVENTION

In accordance with a preferred embodiment of the present invention, a magnetic tag comprises a combination of ferrite particles having specific Curie temperatures disposed within a glass matrix which contains phosphor particles disposed therein for ease of post-detonation identification and collection. These magnetic tags are employed as a tagging system in which a plurality of distinct Curie temperatures define a particular tag code. These tags, comprising particles of ferrite and phosphor held in a glass matrix, are disposed within or on a substance to be identified. In accordance with another preferred embodiment of the present invention, ferrite particles are first mechanically dispersed and subsequently thermally fused within an intrinsically fluorescent glass matrix. In still another embodiment of the present invention, ferrite particles are first disposed within a particle size glass matrix spheroid which is coated with glass containing a phosphor or glass which is inherently fluorescent.

Also disclosed are three methods for the manufacture of magnetic tags. In one preferred method, a mixture of glass, phosphor, and ferrite is homogenized by ball milling, pressed into pellets and fired at a temperature slightly above the annealing temperature of the glass. The fired pellets are then crushed and sized for passage through a flame gun which produces smooth, spheroidal particles. In another preferred method, a mixture of ferrite and glass is homogenized by ball milling; the resulting powder is then wetted with a wetting agent containing a binder. The wetted mixture is then agitated by being vibrated, rolled, or tumbled to cause agglomeration of the powders into spheroidal particles which are fired on a non-wetted substrate, such as boron nitride, at a temperature slightly above the annealing point of the glass so as to produce individual spheroids. In a third preferred method, glass coated ferrite particles such as those produced by firing on a substrate, are sprayed with a wetting agent and binder and coated with either phosphor rich glass powder or intrinsically fluorescent glass powder by a similar agitation step. The powder coating is converted to a glaze by firing.

The magnetic tags described above may also be coated with an adhesive material so that the tags may be affixed to substances to be tagged other than explosives.

Accordingly, it is the object of the present invention to provide magnetic tagging materials which are readily collectible and identifiable even under the severest of environmental conditions. It is a further object of the present invention to provide magnetic tagging materials for explosive materials which do not increase the proclivity for accidental detonation and which are capable of surviving detonation.

DETAILED DESCRIPTION OF THE INVENTION

Figure 1:
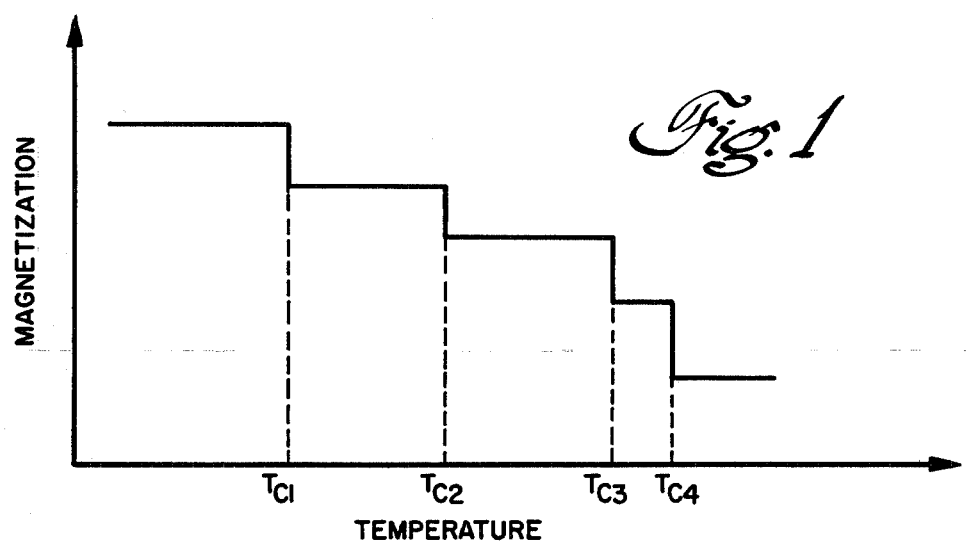
FIG. 1 is a graph of magnetization versus temperature for tagging material comprising ferrites having four distinct Curie temperatures.

FIG. 1, illustrating the concept underlying magnetic tagging, is a graph of magnetization versus temperature for a sample magnetic tag comprising a plurality of ferrites with four distinct Curie temperatures, $T_{C1}$, $T_{C2}$, $T_{C3}$, and $T_{C4}$. As the sample of material is heated, the magnetization is observed to decrease at certain temperatures. The transition is not necessarily as precipitous as FIG. 1 might imply for the scales chosen. The decrease in magnetization is, in actuality, relatively smooth but the transitions in FIG. 1 are depicted as sharp for ease of understanding. Nonetheless, by observing the curve at points of inflection, the Curie temperatures present in the tag are readily discernible. Moreover, the determination of Curie temperature is a repeatable measurement which can be taken as often as desired as long as the ferrite is not heated to temperatures at which the structure or composition are changed. As long as the heating is controlled, measurement of the Curie temperature of even a single ferrite particle of sufficient size is possible.

In a limited number of applications, a tag exhibiting only a single Curie temperature may be required. However, the tagging system of the present invention typically employs tags exhibiting a plurality of Curie temperatures. As discussed below, ferrite materials exhibiting Curie temperatures from room temperature to temperatures in excess of 500° C. are usable. In this temperature range, as many as forty or fifty ferrites, each possessing a distinct Curie temperature, may be employed. For example, if there are fifty such Curie temperatures to choose from, and any five of these are chosen to form a particular tag, than a total of 2,118,760 distinct tag codes are possible. If desired, this number may be increased by increasing the number of distinct Curie temperatures selected. The use of ferrites with up to approximately fifty distinct Curie temperatures is accomplished by employing an average resolution of approximately 10° C. between adjacent Curie temperatures. This resolution is well within the capabilities of existing measuring instruments. If desired, the resolution may be changed to 15° C. between adjacent Curie temperatures at the cost of lowering the number of usable tag codes.

Figure 2:
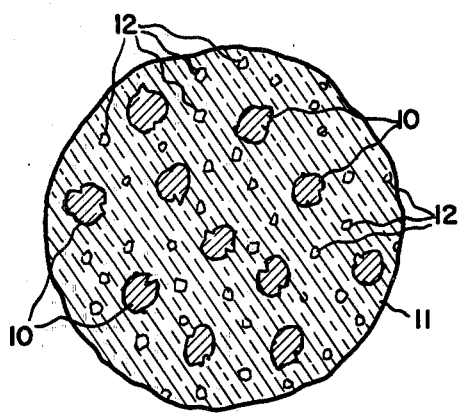
FIG. 2 is a cross section of a tag particle in accordance with a preferred embodiment of the present invention in which a mixture of ferrites and phosphor are disposed within a clear glass.

FIG. 2 illustrates a preferred embodiment of the present invention in which ferrite particles 10, exhibiting at least one Curie temperature, are dispersed within glass matrix 11 which also contains phosphor particles 12. The ferrite particle size is typically between 1 and 10 microns, while the tag particle itself is typically between 100 and 5,000 microns in diameter. Ferrite particles by themselves, however, are not satisfactory for use in explosive tagging because of the tendency of irregularly shaped ferrite particles to sensitize explosive materials. Furthermore, to insure retention of the magnetic code after detonation, it is desirable to bond homogeneous mixtures of ferrite with their particular plurality of Curie temperatures into discrete tag particles. These problems are solved by dispersing the ferrite particles in glass matrix 11.

The glass matrix serves several purposes. First, it produces particles with smooth, spheroidal surfaces. Second, it greatly enhances retention of the magnetic code by providing a matrix capable of withstanding the temperature and pressure of the detonation. Third, the glass matrix serves as a medium for containing phosphor material which aids in post-detonation collection of the tag particles.

Figure 3:
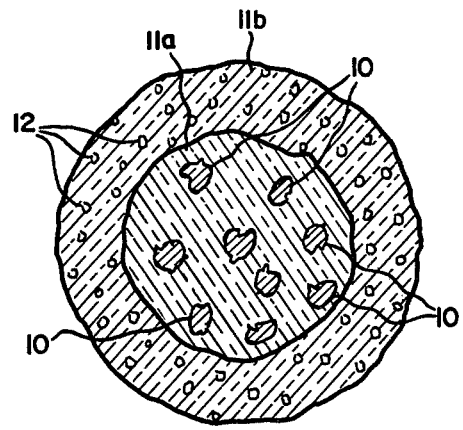
FIG. 3 is a cross-sectional view of a magnetic tag particle in which the ferrite particles are first dispersed within a glass matrix which is then coated with a glaze comprising phosphor particles in a glass matrix.

FIG. 3 shows still another embodiment in which two glass layers are present. In FIG. 3, ferrite particles 10 are first dispersed in phosphor free glass matrix 11a which is then encapsulated in glass matrix 11b containing phosphor material 12. This latter embodiment while being somewhat more difficult to manufacture, provides higher visibility for post-detonation collection, which is typically facilitated by scanning the blast area with an ultraviolet lamp. Additionally, collection may be aided by employment of attractive magnetic means particularly in those blast areas not contaminated by ferrous residues.

Figure 4:
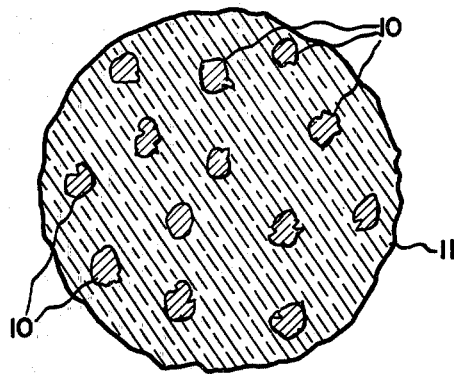
FIG. 4 is a cross-sectional view of a magnetic tag particle comprising ferrite particles surrounded by a smooth glass matrix.

FIG. 4 shows yet another embodiment in which ferrite particles 10 are dispersed within glass matrix 11 without any phosphor added. In this embodiment, post-detonation visibility may be enhanced by employing an intrinsically flourescent glass as glass matrix 11.

The ferrites employed may be any ferrite material exhibiting a relatively sharp magnetization drop at its Curie temperature. For example, nickel-zinc ferrites ($Ni_xZn_{1.0-x}Fe_2O_4$) and cobalt-zinc ($Co_xZn_{1.0-x}Fe_2O_4$) ferrites (where $0<x<1$) may be employed. Nickel-zinc ferrites exhibit Curie temperatures ranging from below 0° C. to approximately 595° C. Virtually any Curie temperature within this range is obtained by carefully varying the concentration of the nickel and zinc, with increases in nickel content and corresponding decreases in the zinc content resulting in the formation of ferrites with higher Curie temperatures. Likewise, cobalt-zinc ferrites which exhibit Curie temperatures ranging from below 0° C. to approximately 520° C. may also advantageously be employed. Increases in the concentration of cobalt with corresponding decreases in the zinc concentration also result in ferrites with increased Curie temperatures.

Magnetic particles other than ferrites may also be used as long as they exhibit sufficiently distinct Curie temperatures and are relatively stable. Ferrites are particularly advantageous in this regard and also exhibit a relatively high magnetization.

The phosphor employed is not critical. However, sufficient amounts of phosphor should survive the temperature and pressure of the detonation to permit visual recovery of the tags upon excitation by ultraviolet light. Two phosphors are particularly useful in this regard. One is zinc silicate doped with manganese ($Zn_2SiO_4:Mn$) which fluoresces green upon exposure to ultraviolet light. Another useful phosphor is yttrium vanadate doped with europium ($YVO_4:Eu$) which fluoresces red upon exposure to ultraviolet light. It is also noted herein that instead of employing a separate phosphor, an intrinsically fluorescent glass may also advantageously be used with or without the addition of a separate phosphor.

One glass which may be employed is transformer sight glass whose composition is given in Table I. This glass is green and has a slight intrinsic green fluorescence under short wavelength ultraviolet excitation, that is, excitation at approximately 2,600 Å. Another useful glass is laboratory glass No. 2107 whose composition is also given in Table I.

Table I

| Compound | Percentage (by weight) | |
| --- | --- | --- |
| | Transformer Sight Glass | Laboratory Glass 2107 |
| silicon dioxide | 63.5 | 60.2 |
| boron oxide | 21.8 | 20.6 |
| aluminum oxide | 3.4 | 3.7 |
| sodium oxide | 5.3 | 5.1 |
| lithium oxide | 3.3 | 3.2 |
| potassium oxide | 2.3 | — |
| vanadium oxide ($V_2O_5$) | 0.3 | 1.0 |
| manganese oxide ($MnO_2$) | 0.1 | — |
| yttrium oxide | — | 5.1 |
| europium oxide ($Eu_2O_3$) | — | 1.1 |

Table I-continued

| Compound | Percentage (by weight) | |
|---|---|---|
| | Transformer Sight Glass | Laboratory Glass 2107 |
| | 100.0 | 100.0 |

A magnetic tag such as that shown in FIG. 2 is easily manufactured in a flame spray process. In this process, a mechanical mixture typically comprising 50 percent glass, 25 percent phosphor, and 25 percent ferrite by weight is homogenized by ball milling. Then pellets are pressed from this mixture and sintered at a temperature above the annealing temperature of the glass so as to bond the particles of the mixture together. These sintered pellets are then crushed and sized for passage through a flame spray gun. With appropriate adjustment of the velocity and temperature of the flame, very smooth and spheroidal particles are produced.

While a wide range of tag particle sizes is producible, a magnetic tag particle diameter of between approximately 100 and approximately 5,000 microns is most advantageous for use of these tags in explosive materials. It is to be noted, however, that these tags have uses other than tagging explosives. In particular, the glass coating provides a protective barrier to protect the ferrite material under a variety of extremely harsh environmental conditions including exposure to heat, pressure, and many corrosive chemical compounds. In particular, along with an appropriate adhesive binder, these magnetic tags may be employed to identify and trace various products of manufacture.

A somewhat different method is employed in the manufacture of magnetic tags having an enriched phosphor outer layer of glass such as that shown in FIG. 3. In this method, a mixture of ferrite particles and glass is homogenized by ball milling. The mixture typically comprises 60 weight percent glass and 40 weight percent ferrite. The dry powder mixture is then wetted with a mixture of wetting agent and binder and agitated by being vibrated, rolled, or tumbled to cause the powder to agglomerate into spheroidal particles. A typical wetting agent and binder includes alcohol and carbowax, respectively. The spheroidal particles are then sintered on a non-wetted substrate such as, for example, boron nitride, at a temperature above the annealing point of the glass. This temperature is approximately 650° C. for the glasses described above and a temperature of approximately 690° C. is preferred to insure adequate glass flow without degradation of the ferrite and its properties. The particles are maintained at this temperature for approximately eight minutes. If desired, after mixing of the ferrite and glass, the powder is pressed and thereafter crushed prior to the spheroidizing step to insure densification of the individual spheroids. In either case, the method as described so far produces spheroidal tags comprising ferrite particles encapsulated within glass. These spheroids are then subjected to a final polishing step, if desired, to reduce any rough surface texture. This polishing is accomplished by jet milling, by polishing between counter-rotating plates, or by ball milling either alone or with a polishing medium. If desired, these particles are then coated with a phosphor-rich glass powder (such as, a mixture of glass and phosphor comprising approximately 25 percent phosphor) or an intrinsically fluorescent glass powder by rolling the particles in the powder which has been sprayed with a wetting agent and binder. This powder coating is then converted to a glaze by a firing treatment such as that described above. The final product comprises ferrite particles encapsulated in a glass sphere and further encapsulated within a concentric glass coating which is intrinsically fluorescent or which fluoresces because it contains therein phosphor material. Such a structure is illustrated in FIG. 3.

Additionally, there are alternate methods for producing spheroidal, composite-glass-ferrite-phosphor tag particles. For example, mixtures of ferrite and phosphor powders are incorporated in a molten glass chosen by either chemistry or smelting temperature to be relatively inert to the ferrite and phosphor. The molten mixture of glass and particles is subsequently formed into spheroidal tags by methods known to those skilled in the art of glass making such as marble making, drop tower manufacture such as used in the formation of shot, and heated fluidized beds.

Each ferrite particle employed possesses its own single, unique Curie temperature and each tag particle exhibits all the Curie temperatures for a particular tag code. However, tagging systems employing tag particles exhibiting only a single Curie temperature are possible as long as tag particles exhibiting all the Curie temperatures of the desired tag code are selectively blended. The latter tagging system, however, is less desirable because of potential difficulty in retrieving a sufficiently large sample size following detonation to confirm the tag code.

Magnetic tags produced in accordance with the invention herein have been tested by mixing the tag with dynamite and exploding the mixture in a three-foot diameter steel vessel. Prior to each test the vessel was thoroughly cleaned and as much rust and scale as possible was removed. In the first test, 2.3 grams each of a red phosphor (yttrium vanadate) magnetic tag and a green phosphor (zinc silicate) magnetic tag were mixed with one-half pound of Dupont Gelex ® dynamite. Each of these magnetic tags comprised approximately 50 percent glass, 25percent ferrite and 25 percent phosphor. The red phosphor tag employed transformer sight glass while the green phosphor tag employed No. 2107 laboratory glass. Following the explosion, which was entirely contained in the steel or vessel, residue was collected using a whisk broom and dust pan and also using a vacuum cleaner with a filter bag. Both the red and green magnetic tags were collected and their Curie temperatures determined. The green tags, however, appeared to be somewhat more visible under ultraviolet light than the red tags. Similar results were obtained using transformer sight glass in a magnetic tag comprising 40 percent glass, 30 percent ferrite, and 30 percent (by weight) of the zinc silicate phosphor. Successful results were likewise obtained with a magnetic tag comprising 80 percent transformer sight glass, 10 percent ferrite, and 10 percent (by weight) of the zinc silicate phosphor.

The containment of the explosion within the relatively small volume of the steel vessel produces shock in excess of what would normally be encountered in a terrorist explosion. In addition, since the sphere was steel, much of the residue was magnetic, making separation difficult. Nonetheless, even under these severe conditions, magnetic tags were collected and identified.

From the above, it may be appreciated that the embodiments of the present invention provide a rugged magnetic tag capable of surviving explosive detonations. Furthermore, this tag is easily collected after the explosion and may be quickly identified. It can be further appreciated from the disclosures herein, that the magnetic tags are easily and inexpensively manufacturable. Thus, the present invention provides a significant aid to law enforcement agencies charged with investigations of bombing incidents and other explosives related crimes. The present invention also provides extremely rugged identification means for a variety of other products.

While this invention has been described with reference to particular embodiments and examples, other modifications and variations will occur to those skilled in the art in view of the above teachings. Accordingly, it should be understood that the appended claims are intended to cover all such modifications and variations as fall within the true spirit of the invention.

The invention claimed is:

1. A method for manufacturing a magnetic tag for identifying explosive compositions comprising the steps of:
   (A) homogenizing a mixture of ferrite, phosphor, and glass in a ball mill;
   (B) pressing the homogenized mixture into pellets;
   (C) sintering the pellets at a temperature slightly above the annealing temperature of the glass;
   (D) crushing the sintered pellets to form a powder;
   (E) flame-spraying the powder at a velocity and temperature sufficient to form smooth, spheroidal particles.

2. The method of claim 1 in which the mixture of step A comprises approximately 50 percent glass by weight, approximately 25 percent phosphor by weight, and approximately 25 percent ferrite by weight.

3. The method of claim 1 in which the sintering occurs at a temperature of approximately 690° C.

4. A method for manufacturing a magnetic tag for identifying explosive compositions comprising the steps of:
   (A) homogenizing a mixture of ferrite and glass in a ball mill;
   (B) mixing said mixture with a first wetting agent and a first binder;
   (C) agitating said mixture to form an agglomeration of spheroidal particles;
   (D) sintering said agglomeration on a non-wetted substrate at a temperature slightly above the annealing temperature of the glass to form spheriodal particles;
   (E) rolling said spheroidal particles in a phosphor rich glass powder to which a second wetting agent and a second binder have been added, to form a powder coat on said particles;
   (F) firing said coated particles at a temperature sufficient to convert the powder coat to a glaze.

5. The method of claim 4 in which the mixture of step A comprises approximately 60 percent glass by weight and approximately 40 percent ferrite by weight.

6. The method of claim 4 in which the sintering occurs at a temperature of approximately 690° C.

7. The method of claim 4 in which said first and second wetting agents comprise alcohol.

8. The method of claim 4 in which said first and second binders comprise carbowax.

9. The method of claim 4 in which subsequent to step D and prior to step E, the particles are polished to remove exterior roughness.

10. The method of claim 4 further comprising, subsequent to step B and prior to step C, the steps of:
    pressing the mixture from step B into pellets; and
    crushing said pellets.

11. A method for manufacturing a magnetic tag for identifying explosive compositions comprising the steps of:
    (A) homogenizing a mixture of ferrite, glass, and phosphor in a ball mill;
    (B) mixing said mixture with a wetting agent and a binder;
    (C) agitating said mixture to form an agglomeration of spheroidal particles; and
    (D) sintering said agglomeration on a non-wetted substrate at a temperature slightly above the annealing temperature of the glass to form spheroidal particles.

12. A method for manufacturing a magnetic tag for identifying explosive compositions comprising the steps of:
    (A) homogenizing a mixture of ferrite and inherently fluorescent glass in a ball mill;
    (B) mixing said mixture with a wetting agent and a binder;
    (C) agitating said mixture to form an agglomeration of spheroidal particles; and
    (D) sintering said agglomeration on a non-wetted substrate at a temperature slightly above the annealing temperature of the glass to form spheroidal particles.

* * * * *